Aug. 7, 1962 G. M. WRIGHT 3,048,075
VISUAL SOUND REPRESENTATION
Filed Aug. 8, 1960

INVENTOR.
GILBERT M. WRIGHT
BY
Mibetta and Glenny
ATTORNEYS.

United States Patent Office 3,048,075
Patented Aug. 7, 1962

3,048,075
VISUAL SOUND REPRESENTATION
Gilbert M. Wright, 21642 Rambla Vista, Malibu, Calif.
Filed Aug. 8, 1960, Ser. No. 48,144
19 Claims. (Cl. 84—464)

In general, this invention relates to a system and a method for the visual representation of sound. More particularly, the invention synchronizes the movement of a visual pattern such as a color pattern with audible sound such as music.

There have been a number of prior art systems and methods proposed for relating color and music. An example of such prior art systems was an arrangement whereby when one struck a piano key, a corresponding colored light would come on. Such arrangement, of course, produced a pleasing effect but it obviously had serious shortcomings. The selection of color combinations was limited and the color patterns obtained were even more limited. In addition such arrangement was complex and expensive in requiring separate electrical circuits for each color.

The present invention is not only simple and inexpensive but also has an extremely wide range of flexibility in its color combinations and patterns. The sound used in the present invention may be a single desired frequency and amplitude or may be a combination of frequencies or amplitudes or, most important, may consist of varying frequencies and amplitudes. In addition, the present invention is capable of giving a three-dimensional representation of any sound and, for music, not only a representation of rhythm but also tonal values. The present invention also permits investigation of particular sounds by eliminating the effect of any background noise and maintenance of a particular sound-pattern relationship as long as desired. For such reasons, the present invention permits investigation of particular sounds by eliminating the effect of any background noise and maintenance of a particular sound-pattern relationship as long as desired. Likewise, the present invention may be used to visually aid the analysis of complex sound patterns or the education of children as to the physical nature of sound waves. However, most important, the present invention may be used to promote advertising displays and increase enjoyment of music by simultaneously appealing to both the auditory and visual senses.

Broadly the system of the present invention comprises a sound representation unit including a holder supporting a multiplicity of freely movable objects, said objects differing at least in one of the characteristics of size, shape, density, color and transparency and at least one electromechanical transducer operatively associated with said holder to convert its oscillating electrical current input into movements of the freely movable objects. In addition the system of the present invention also requires a means for generating an oscillating electrical current correlated to sound such as the conventional phonograph pickup with its associated amplification system and means for transmitting said oscillating electrical current output to the transducers in the sound representation unit such as the conventional metal wires. The result is that the sound from any source produces synchronized movements of the freely movable objects with the sound. For example, if music is used to set up the movements of the freely movable objects, such movements will represent not only the rhythm of the music but also its tonal values because the variation in density of the objects makes them behave differently with respect to the various tones.

An object of this invention is to visually represent and maintain sounds without interference from background and extraneous noise.

Another object of this invention is to synchronize the three-dimensional movement of a visual pattern with sound so that the image of the pattern may be projected upon a surface.

Another object of this invention is to synchronize the movement of a projected color pattern with music so that both the rhythm and tonal values of the music are represented.

Other objects and advantages of this invention will be readily apparent from the following description of the drawings, in which are illustrated some exemplary embodiments of this invention.

Figure 1:
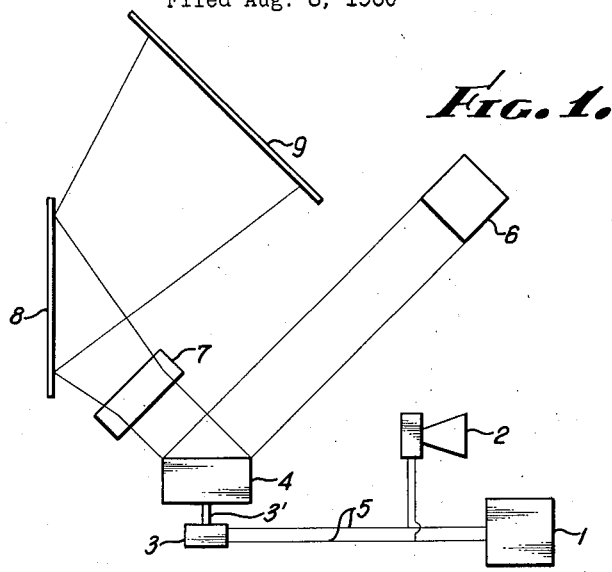
FIG. 1 is a semi-diagrammatic view of a system for synchronizing the movements of a projected color pattern with music.

An embodiment of the present invention for synchronizing the movement of a projected color pattern with music is shown semi-diagrammatically in FIG. 1. Music from any source such as a phonograph record, radio waves, or an orchestra is supplied to a conventional means 1 for generating an oscillating electrical current correlated to such music. Representative of such conventional means are the phonograph pick-up, the radio receiver and the microphone, each, of course, being connected with its associated amplification system. When it is desired to maintain a particular sound as represented by a particular oscillation or set of oscillations for a period of time, then conventional means for doing so will also be included in means 1 e.g. a conventional recordation and playback system. Part of the oscillating electrical current output of means 1 is transmitted by metal wires 5 to a conventional speaker 2 which converts it into audible music. The remainder of the oscillating electrical current output is transmitted by conducting wires 5 to the sound representation unit comprising an electromechanical transducer 3, a sounding post 3' and a holder 4. The transducer 3 converts the oscillating electrical current into mechanical vibrations which are transmitted to holder 4 by the sounding post 3'. The transducer 3 is the conventional driving motor used in standard speakers and by analogy holder 4 replaces the sound radiator in standard speakers. A projected visual representation of the movements of the objects in the sound representation unit may be obtained by several conventional means. For example, a light source 6 directs light upon holder 4 and the reflected light is directed through a focusing lens system 7 onto a reflecting mirror 8 and finally onto a screen 9. The present invention as embodied in FIG. 1 produces an image on screen 9 of the varying color patterns formed by the movements of the objects in the holder 4 and such variation is synchronized with the audible music from speaker 2.

Figure 2:
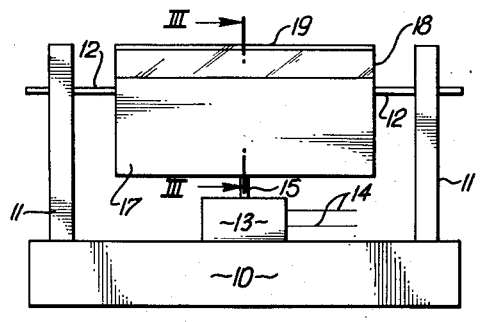
FIG. 2 is a side-view of a particular sound representation unit.

A more detailed sketch of a particular sound representation unit is shown in FIG. 2. A supporting means consisting of base 10 and posts 11 is used for the transducer 13, a container 17, and a transparent pan 18 with a transparent cover 19. The transducer 13 is connected by conductors 14 to a means for converting a source of sound into an oscillating electrical current output (not shown) and is operatively associated with container 17 and pan 18 and the contents thereof by means of sounding post 15. The holder in the sound representation unit in FIG. 2 consists of container 17 surmounted by pan 18 with its cover 19 and the holder is supported by posts 11 by means of arms 12. Arms 12 may be supported by posts 11 to permit freedom of movement in any direction; however arms 12 may also be rigidly connected to posts 11 if they themselves are sufficiently flexible or resilient to permit vibration of the holder.

Figure 3:
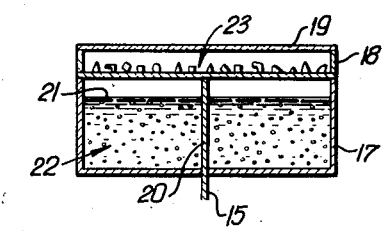
FIG. 3 is a sectional view of the holder in FIG. 2 taken in the plane indicated by line III—III in FIG. 2.

The holder of the sound representation unit shown in FIG. 2 is shown in cross-section in FIG. 3 and may be made of materials such as glass or plastic. In FIG. 3, container 17 is partially or completely filled with a transparent liquid 21 such as water (or solution or organic liquid of suitable specific gravity) and has therein freely movable fine particles 22. The fine particles 22 are highly reflective and sufficiently small so that they remain in suspension during the agitation of liquid 21 and they usually include a plurality of groups, the members of any one group having a common characteristic such as density and/or color which is different from the other groups. A representative set of fine particle groups is gold, silver and anodized aluminum. In FIG. 3 container 17 is surmounted by pan 18 with a cover 19 containing freely movable shaped bodies 23. The shaped bodies are usually transparent and colored and usually include a plurality of groups, the members of any one group having a common characteristic such as density and/or color which is different from the other groups. A representative set of groups is made from various well known plastic compositions and consists of lifelike figures such as dancers, conductors, and musicians and geometric shapes such as squares, triangles and circles. In FIG. 3, the sounding post 15 is attached to the bottom of container 17 and sounding post 20 is attached between the bottoms of pan 18 and container 17. The mechanical vibrations coming from transducer 13 are transmitted to container 17 and pan 18 by means of sounding posts 15 and 20. The vibrations of pan 18 are transmitted to shaped bodies 23 and the vibrations of container 17 are transmitted to liquid 21 which in turn transmits them to the fine particles 22.

Figure 4:
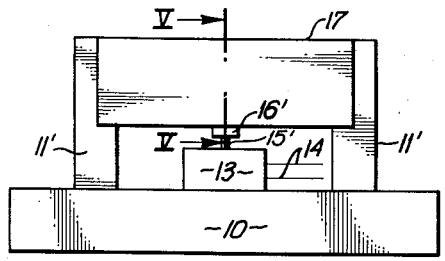
FIG. 4 is a side view of another sound representation unit.
Figure 5:
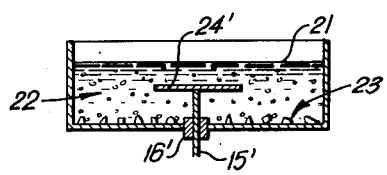
FIG. 5 is a sectional view of the holder in FIG. 4 taken in the plane indicated by line V—V in FIG. 4.

The particular sound representation unit shown in FIGS. 4 and 5 is similar in most respects to the one shown in FIGS. 2 and 3 but it does have some significant differences. The supporting means consisting of base 10 and posts 11' are used for transducer 13 and container 17. Transducer 13 is connected by wires 14 to a means for converting a source of sound into an oscillating electrical current output (not shown) and is operatively associated with the contents of container 17 by means of sounding post 15'. The holder in the sound representation unit in FIG. 4 consists of container 17 and is rigidly supported by posts 11'.

The holder of the sound representation unit shown in FIG. 4 is shown in cross-section in FIG. 5. In FIG. 5, container 17 is partially filled with a transparent liquid 21 and has therein freely movable fine particles 22 and shaped bodies 23. In FIG. 5, the sounding post 15' protrudes into container 17 through a gasket 16' and is surmounted by a disk 24' immersed in liquid 21. The mechanical vibrations coming from the transducer 13 are transmitted directly to the liquid 21 by means of sounding post 15' and disk 24' and the liquid 21 in turn transmits them to the fine particles 22 and the shaped bodies 23.

The method of the present invention is to convert a source of sound into an oscillating electrical current output by conventional means such as a phonograph, radio or microphone and to transmit the current to a multiplicity of freely movable objects, said objects differing at least in one of the characteristics of size, shape, density, color and transparency. Primarily the current is converted into movements of the objects but part of it may be converted into audible sound such as music. Likewise the method may include projecting a visual representation of the movements of the objects. The movements of the objects will, of course, represent the overall rate of oscillation of the electrical current e.g. the rhythm of music. However, in addition, the variation in shape and size and density in particular makes the objects respond differently to particular frequencies in the oscillation of the electrical current e.g. musical tones. Conversely all the objects of a specific size and shape and especially density tend to respond similarly to a given frequency in the oscillation of the electrical current. Consequently each group of objects with common size, shape and density characteristics forms its own particular varying pattern and all such patterns together are expressive of all the oscillations of the electrical current e.g. both the rhythm and tonal values of music. Where varying color patterns are synchronized with music, shaped objects such as lifelike figures will dance, bound and whirl on the vibrating pan and thus visually express the music. The fine particles in the liquid will weave numberless background patterns to visually express the music since particles of similar density tend to stay together and seek the varying nuls of vibration within the liquid.

There are a number of obvious modifications and alterations which can be made with respect to the exemplified system in addition to those already noted i.e. the mode of transmitting vibrations to the freely movable objects and the mode of supporting the holder. For example, the holder for the freely movable objects may be of any desired shape or size and either may or may not contain liquid. The use of liquid is preferred in that it damps out stray incidental vibrations and permits the movement of the object to be truly expressive of the sound presently being impressed. If the holder is only partially filled with liquid or contains two or more immiscible liquids of different densities, then the objects on the surface or immersed in the less dense liquid may move more freely and form a different varying pattern from the objects immersed in the more dense liquid. Of course the transducer may be operatively associated with the holder in other ways besides direct mechanical connection such as one or more sounding posts and more than one transducer may be operatively associated with a single holder where it is desired to impress vibrations on the freely movable objects from more than one direction. The projection system may consist of simply a light source and light refracted onto a screen or light may be passed through the mobile body of suspended particles and projected onto a screen. Where a particular pattern is especially interesting or pleasing, it may be maintained by the use of the conventional means such as already noted and if a permanent impression is desired, a transparent low viscosity, conventional plastic composition which sets upon the application of heat or addition of a chemical reagent may be used as the liquid in the holder. Once the desired pattern is obtained, the plastic may then be set. If more complex color patterns are desired, than are obtained simply from the freely movable objects in the holder, then the light source being directed upon the sound representation unit may be colored or have changing colors. Likewise the liquid in the holder instead of being merely transparent or translucent may be colored or have changing colors. It is, of course, understood, that the foregoing description does not place limitations on the present invention but merely illustrates particular embodiments of the present invention. The present invention covers all methods and systems coming within the scope of the following claims.

I claim:

1. A simple, inexpensive system which synchronizes the movement of a visual pattern with audible sound adapted for use which aids research and education into the nature of sound, promotes advertising displays and increases entertainment, said system comprising: a sound representation unit including a flexibly-supported container at least partially filled with a liquid having therein a multiplicity of freely movable fine particles and shaped bodies, said fine particles and shaped bodies differing at least in one of the characteristics of density, color and transparency, and at least one electromechanical transducer operatively associated with said container, said transducer being adapted to convert its oscillating electrical current input into mechanical vibrations of the container and into movements of the freely movable fine particles and shaped bodies; means for generating an oscillating electrical current correlated to sound; at least one speaker for converting its oscillating electrical current input into audible sound; and means for transmitting said oscillating electrical current to said transducer and speaker to produce audible sound accompanied by a varying color pattern caused by the synchronized movement of the freely movable fine particles and shaped bodies with said sound.

2. A system as stated in claim 1 wherein the freely movable fine particles and shaped bodies comprise a plurality of groups, the members of any one group having at least one common characteristic.

3. A system as stated in claim 1 which includes means for projecting a visual representation of the varying color pattern.

4. A system for the production of visual representation of sound, said system comprising: a sound representation unit including a holder supporting a multiplicity of small freely movable objects, said objects differing at least in one of the characteristics of size, shape, density, color and transparency, and at least one electromechanical transducer operatively associated with said multiplicity of objects, said transducer being adapted to convert its oscillating electrical current input into movements of the freely movable objects; means for generating an oscillating electrical current correlated to sound; and means for transmitting said oscillating electrical current to said transducer to produce movement of the freely movable objects synchronized with said sound.

5. A system as stated in claim 4 wherein the holder is at least partially filled with liquid.

6. A system as stated in claim 5 wherein said liquid is transparent.

7. A system as stated in claim 5 wherein said liquid consists of at least two immiscible components.

8. A system as stated in claim 5 wherein at least part of the freely movable objects are suspended in the liquid.

9. A system as stated in claim 4 wherein the freely movable objects comprise a plurality of groups of objects, the objects in any one group having at least one common characteristic.

10. A system as stated in claim 9 wherein at least one of the groups of objects has the characteristics of being light-reflecting fine particles.

11. A system as stated in claim 4 wherein the transducer converts its oscillating electrical current input into mechanical vibrations of the holder and into movements of the freely movable objects.

12. A system as stated in claim 4 which includes means for projecting a visual representation of the movement of the freely movable objects.

13. A system as stated in claim 12 wherein said projection means includes a light source directed upon the holder and a surface upon which the visual representation is projected by the light coming from said holder.

14. A system as stated in claim 13 wherein the light from the light source is reflected by the contents of the container onto the surface.

15. A simple, inexpensive system which synchronizes the movement of a color pattern with music which aids research and education into the nature of sound, and not only promotes advertising displays but also increases enjoyment of music by simultaneous appeal to both the auditory and visual senses, said system comprising: a transparent, flexibly-supported container at least partially filled with a transparent liquid having therein a multiplicity of freely movable fine particles, said fine particles differing at least in one of the characteristics of density, color and transparency, a transparent pan covering said container having therein a multiplicity of freely movable shaped bodies, said shaped bodies differing at least in one of the characteristics of density, color and transparency, a sounding post attached between the bottoms of the container and the pan, and an electromechanical transducer attached to the bottom of said container which converts its oscillating electrical current input into mechanical vibrations of the container and pan and into movements of the freely movable fine particles and shaped bodies; means for generating an oscillating electrical current correlated to music; a speaker for converting its oscillating electrical input into audible music; means for transmitting said oscillating electrical current output to said transducer and speaker; and means for projecting a visual representation of the movements of the fine particles and shaped bodies including a light source directed upon the pan and container and a surface upon which said visual representation is reflected whereby the music produces audible music accompanied by movement of the fine particles and shaped bodies synchronized with the audible music.

16. A system as stated in claim 15 wherein the pan is partially filled with transparent liquid.

17. A system as stated in claim 15 wherein the freely movable fine particles and shaped bodies comprise a plurality of groups, the members of any one group having at least one common characteristic.

18. A method of producing visual representations of sound for entertainment, advertising, artistic, and technological purposes which comprises: converting a source of sound into an oscillating electrical current, transmitting said oscillating electrical current to a body of liquid containing a multiplicity of freely movable objects, said objects differing at least in one of the characteristics of size, shape, density, color and transparency, and converting said oscillating electrical current into movements of the freely movable objects in said liquid whereby the sound from said source produces movement of the freely movable objects synchronized with the sound.

19. A method of producing visual representations of music for entertainment, advertising, artistic and technological purposes which comprises: converting a source of music into an oscillating electrical current, transmitting said oscillating electrical current to a multiplicity of freely movable objects, said objects differing at least in one of the characteristics of size, shape, density, color and transparency, converting part of said current into movements of the freely movable objects, converting the remainder of said current into audible music, and projecting a visual representation of the movements of the freely movable objects whereby the music from said source produces audible music accompanied by synchronized movement of the freely movable objects with the music.

References Cited in the file of this patent

UNITED STATES PATENTS

| 1,977,997 | Patterson | Oct. 23, 1934 |
| 2,155,659 | Jeffree | Apr. 25, 1939 |
| 2,155,660 | Jeffree | Apr. 25, 1939 |
| 2,155,661 | Jeffree | Apr. 25, 1939 |

FOREIGN PATENTS

| 1,053,494 | France | Feb. 2, 1954 |